US009634992B1

(12) United States Patent
Rostamabadi et al.

(10) Patent No.: US 9,634,992 B1
(45) Date of Patent: Apr. 25, 2017

(54) PROBABILISTIC DUPLICATE DETECTION

(71) Applicant: Palo Alto Networks, Inc., Santa Clara, CA (US)

(72) Inventors: Farshad Rostamabadi, Los Gatos, CA (US); Shadi Rostami-Hesarsorkh, Los Altos, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 14/634,797

(22) Filed: Feb. 28, 2015

(51) Int. Cl.
*H04L 12/24* (2006.01)
*H04L 29/06* (2006.01)
*G06F 17/30* (2006.01)
*G06F 21/45* (2013.01)

(52) U.S. Cl.
CPC .... *H04L 63/0236* (2013.01); *G06F 17/30867* (2013.01)

(58) Field of Classification Search
CPC ............. G06F 11/3082; G06F 11/3065; G06F 17/30029; G06F 17/30867
See application file for complete search history.

(56) References Cited

U.S. PATENT DOCUMENTS

| | | | | |
|---|---|---|---|---|
| 9,171,153 | B2 * | 10/2015 | Jorgensen | G06F 21/56 |
| 2005/0033803 | A1 * | 2/2005 | Vleet | G06F 17/30867 |
| | | | | 709/203 |
| 2014/0244790 | A1 * | 8/2014 | Ise | H04L 67/1002 |
| | | | | 709/217 |
| 2014/0372216 | A1 * | 12/2014 | Nath | G06Q 30/0256 |
| | | | | 705/14.54 |
| 2015/0356196 | A1 * | 12/2015 | Sreenivas Prasad | G06F 17/30887 |
| | | | | 707/740 |

OTHER PUBLICATIONS

One is Enough: Distributed Filtering for Duplicate Elimination. Koloniari et al.CIKM(2011).*
CN103383665. English Translation. Nov. 6, 2013.*
CN 102663058. Englsih Translation. Sep. 12, 2012.*
Pei Cao, "Bloom Filters—the math", Jul. 5, 1998, http://pages.cs.wisc.edu/~cao/papers/summary-cache/node8.html.
Author Unknown, "Bloom filter", Wikipedia, Feb. 16, 2015, http://web.archive.org/web/20150218140142/http://en.wikipedia.org/wiki/Bloom_filter.

* cited by examiner

*Primary Examiner* — Venkat Perungavoor
(74) *Attorney, Agent, or Firm* — Van Pelt, Yi & James LLP (57) ABSTRACT

A first unclassified uniform resource locator (URL) is received. An originally primary bloom filter is initialized. A second bloom filter is initialized. In response to receiving a "no match" result from querying the primary bloom filter for the received first unclassified URL, insert operations are performed on both the originally primary bloom filter and the secondary bloom filter. At a time subsequent to inserting the first unclassified URL into both the originally primary and secondary bloom filters, a determination is made that a false positive rate associated with the originally primary bloom filter exceeds a threshold. In response to the determination, the secondary bloom filter is designated as a replacement primary.

21 Claims, 7 Drawing Sheets

| m/n | k | k=1 | k=2 | k=3 | k=4 | k=5 | k=6 | k=7 | k=8 |
|---|---|---|---|---|---|---|---|---|---|
| 2 | 1.39 | 0.393 | | | | | | | |
| 3 | 2.08 | 0.283 | 0.4 | | | | | | |
| 4 | 2.77 | 0.221 | 0.237 | 0.253 | | | | | |
| 5 | 3.46 | 0.181 | 0.155 | 0.147 | 0.16 | | | | |
| 6 | 4.16 | 0.154 | 0.109 | 0.092 | 0.092 | 0.101 | | | |
| 7 | 4.85 | 0.133 | 0.0804 | 0.0609 | 0.0561 | 0.0578 | 0.0638 | | |
| 8 | 5.55 | 0.118 | 0.0618 | 0.0423 | 0.0359 | 0.0347 | 0.0364 | | |
| 9 | 6.24 | 0.105 | 0.0489 | 0.0306 | 0.024 | 0.0217 | 0.0216 | 0.0229 | |
| 10 | 6.93 | 0.0952 | 0.0397 | 0.0228 | 0.0166 | 0.0141 | 0.0133 | 0.0135 | 0.0145 |
| 11 | 7.62 | 0.0869 | 0.0329 | 0.0174 | 0.0118 | 0.00943 | 0.00844 | 0.00819 | 0.00846 |
| 12 | 8.32 | 0.08 | 0.0276 | 0.0136 | 0.00864 | 0.0065 | 0.00552 | 0.00513 | 0.00509 |
| 13 | 9.01 | 0.074 | 0.0236 | 0.0108 | 0.00646 | 0.00459 | 0.00371 | 0.00329 | 0.00314 |
| 14 | 9.7 | 0.0689 | 0.0203 | 0.00875 | 0.00492 | 0.00332 | 0.00255 | 0.00217 | 0.00199 |
| 15 | 10.4 | 0.0645 | 0.0177 | 0.00718 | 0.00381 | 0.00244 | 0.00179 | 0.00146 | 0.00129 |
| 16 | 11.1 | 0.0606 | 0.0156 | 0.00596 | 0.003 | 0.00183 | 0.00128 | 0.001 | 0.000852 |
| 17 | 11.8 | 0.0571 | 0.0138 | 0.005 | 0.00239 | 0.00139 | 0.000935 | 0.000702 | 0.000574 |
| 18 | 12.5 | 0.054 | 0.0123 | 0.00423 | 0.00193 | 0.00107 | 0.000692 | 0.000499 | 0.000394 |
| 19 | 13.2 | 0.0513 | 0.0111 | 0.00362 | 0.00158 | 0.000839 | 0.000519 | 0.00036 | 0.000275 |
| 20 | 13.9 | 0.0488 | 0.00998 | 0.00312 | 0.0013 | 0.000663 | 0.000394 | 0.000264 | 0.000194 |
| | | | 0.00906 | 0.0027 | 0.00108 | 0.00053 | 0.000303 | 0.000196 | 0.00014 |

PROBABILISTIC DUPLICATE DETECTION

BACKGROUND OF THE INVENTION

Firewalls and other security devices typically enforce policies against network traffic based on a set of rules. In some cases, the rules may be based on uniform resource locator (URL) information, such as by preventing a user from accessing a specific URL (e.g., denying access to http://www.example.com), or by preventing a user from accessing a category associated with the URL (e.g., denying access to URLs classified as "social networking" or "pornographic"). Unfortunately, due to factors such as the sheer number of URLs in existence, and resource constraints (e.g., on the security device), it can be difficult to efficiently match rules that make use of URL information, in particular where information about the URL is limited.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
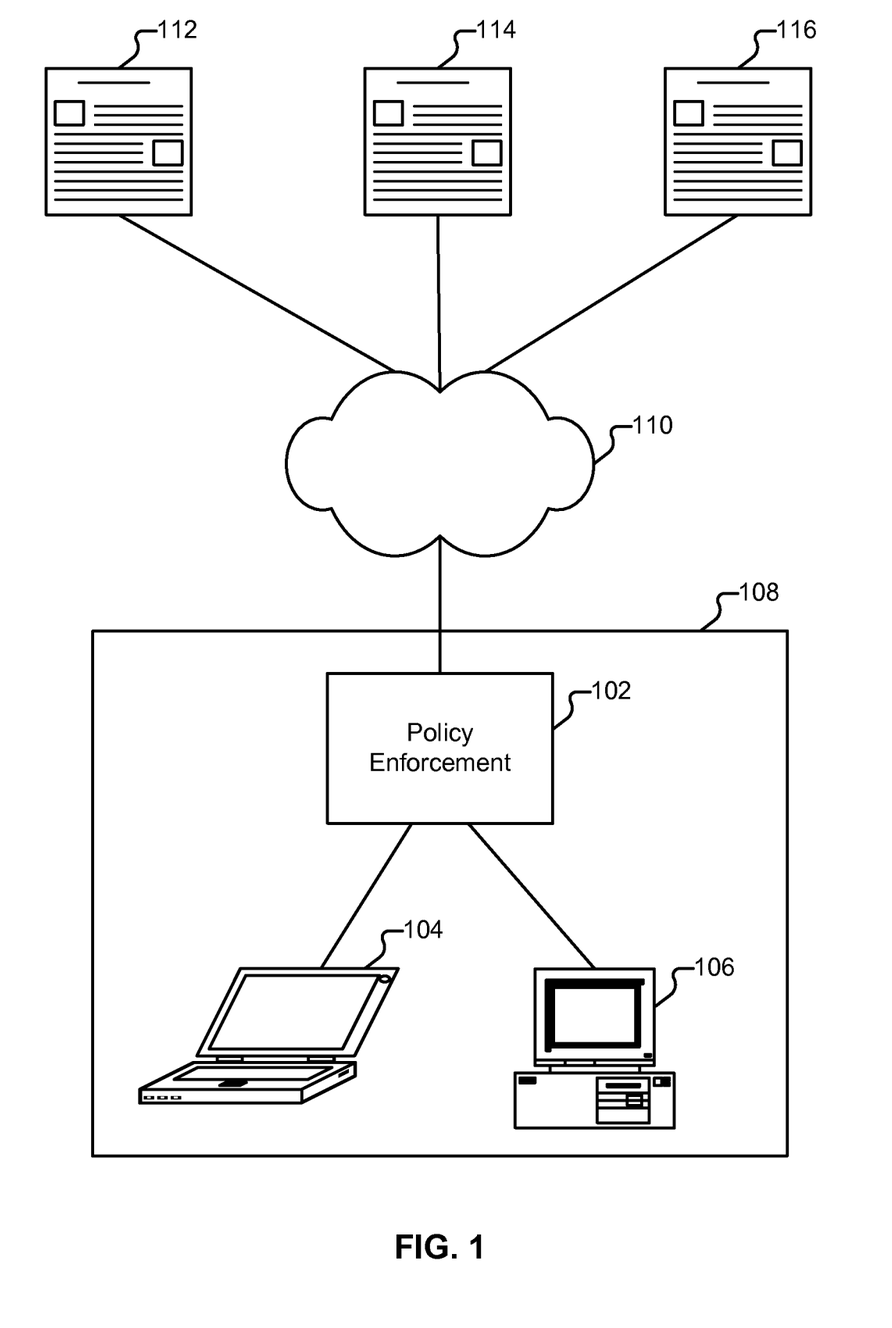
FIG. 1 illustrates an embodiment of an environment in which policies that include URL information are enforced.

FIG. 1 illustrates an embodiment of an environment in which policies that include URL information are enforced. In the example shown, clients 104 and 106 are a laptop computer and desktop computer, respectively, present in an enterprise network 108. Policy enforcement appliance 102 (also referred to herein as "appliance 102") is configured to enforce policies regarding communications between clients, such as clients 104 and 106, and nodes outside of enterprise network 108 (e.g., reachable via external network 110). One example of a policy is a rule prohibiting any access to site 112 (a pornographic website) by any client inside network 108. Another example of a policy is a rule prohibiting access to social networking site 114 by clients between the hours of 9 am and 6 pm. Yet another example of a policy is a rule allowing access by clients to streaming video website 116, subject to a bandwidth or other consumption constraint. Other types of policies can also be enforced, such as ones governing traffic shaping, quality of service, or routing with respect to a given URL, pattern of URLs, category of URLs, or other URL information. In some embodiments, policy enforcement appliance 102 is also configured to enforce policies with respect to traffic that stays within enterprise network 108.

The functionality provided by policy enforcement appliance 102 can be provided in a variety of ways. For example, policy enforcement appliance 102 can be a dedicated device or set of devices. The functionality provided by appliance 102 can also be integrated into or executed as software on a general purpose computer, a computer server, a gateway, and/or a network/routing device. Further, whenever appliance 102 is described as performing a task, a single component, a subset of components, or all components of appliance 102 may cooperate to perform the task. Similarly, whenever a component of appliance 102 is described as performing a task, a subcomponent may perform the task and/or the component may perform the task in conjunction with other components. In various embodiments, portions of appliance 102 are provided by one or more third parties. Depending on factors such as the amount of computing resources available to appliance 102, various logical components and/or features of appliance 102 may be omitted and the techniques described herein adapted accordingly. Similarly, additional logical components/features can be added to appliance 102 as applicable. As one example, while throughout the following description, reference will be made to pairs of bloom filters, in various embodiments, more than two bloom filters (e.g., a set of three or more) can be used instead.

Figure 2:
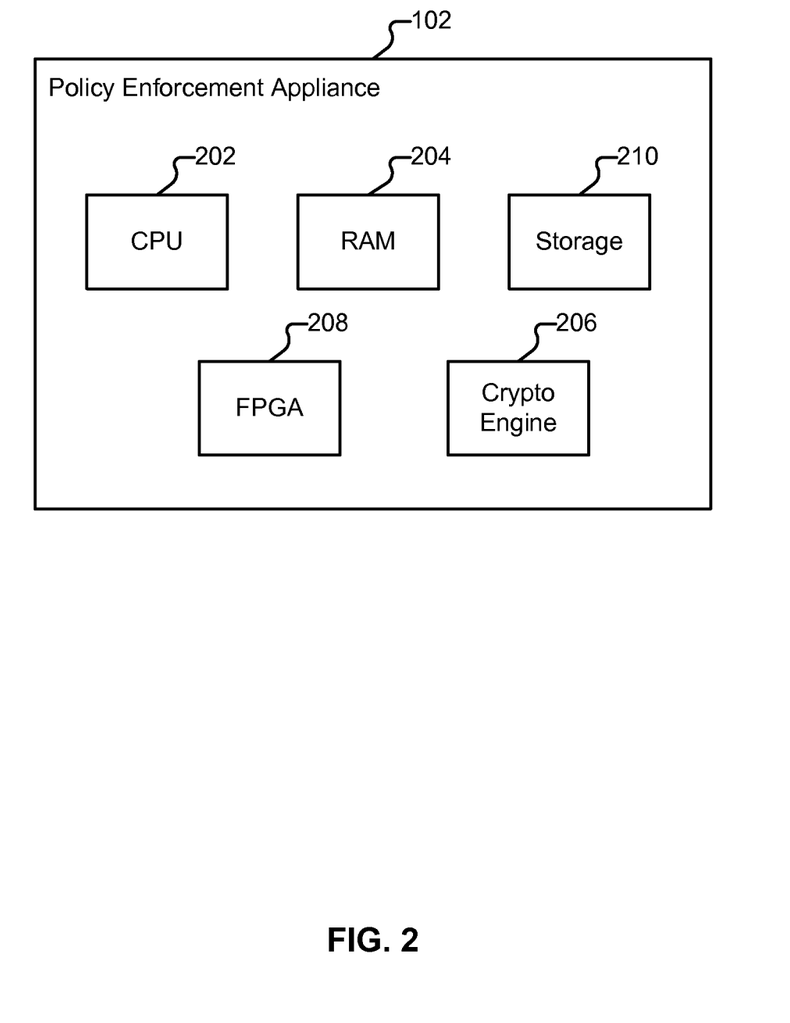
FIG. 2 illustrates an embodiment of a policy enforcement appliance.

FIG. 2 illustrates an embodiment of a policy enforcement appliance. The example shown is a representation of physical components that are included in appliance 102, in some embodiments. Specifically, appliance 102 includes a high performance multi-core CPU 202 and RAM 204. Appliance 102 also includes a storage 210 (such as one or more hard disks), which is used to store policy and other configuration information, as well as URL information. Policy enforcement appliance 102 can also include one or more optional hardware accelerators. For example, policy enforcement appliance 102 can include a cryptographic engine 206 configured to perform encryption and decryption operations, and one or more FPGAs 208 configured to perform matching, act as network processors, and/or perform other tasks.

Figure 3:
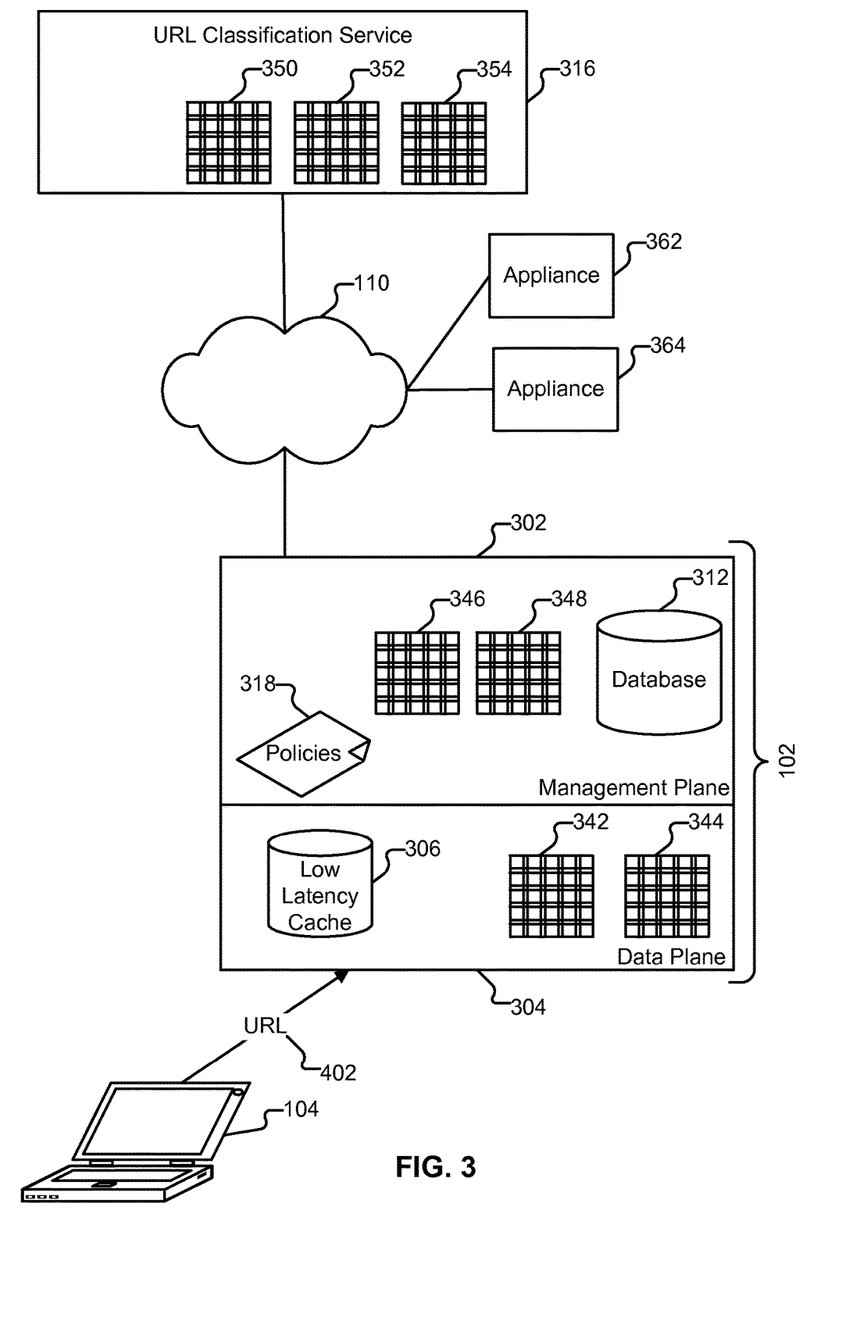
FIG. 3 illustrates an embodiment of a policy enforcement appliance.

FIG. 3 illustrates an embodiment of a policy enforcement appliance. In the example shown, the functionality of policy enforcement appliance 102 is implemented in a firewall. Specifically, appliance 102 includes a management plane 302 and a data plane 304. The management plane is responsible for managing user interactions, such as by providing a user interface for configuring policies (318) and viewing log data. The data plane is responsible for managing data, such as by performing packet processing (e.g., to extract URLs) and session handling. In various embodiments, a scheduler is responsible for managing the scheduling of requests (e.g., as presented by data plane 304 to management plane 302, or as presented by management plane 302 to URL classification service 316).

One task performed by the firewall is URL filtering. Suppose network 108 belongs to a company, "ACME Corporation." Specified in appliance 102 is a set of policies 318, some of which govern the types of websites that employees may access, and under what conditions. As one example, included in the firewall is a policy that permits employees to access news-related websites. Another policy included in the firewall prohibits, at all times, employees from accessing pornographic websites. Also included in the firewall is a database of URLs (312) and associated categories. Other information can also be associated with the URLs in the database instead of or in addition to category information, and that other information can be used in conjunction with policy enforcement.

In some embodiments, database 312 is provided by a third party, such as through a subscription service. In such a scenario, it is possible that instead of the URLs being directly stored in database 312, a transformation is applied to the URLs prior to storage. As one example, MD5 hashes of URLs can be stored in database 312, rather than the URLs themselves. In some embodiments, the URLs stored in database 312 (or transformations thereof) represent the top X URLs for which access is most likely to be sought by users of client devices, such as client 104, where X can be configured based on the computing and other resources available to appliance 102. As one example, suppose database 312 includes 20 million URLs and is stored in storage 210. Also included in the firewall, in various embodiments, are one or more caches, such as cache 306, which is loaded into RAM 204. Additional details regarding components shown in FIG. 3 are provided below.

When a user of client 104 (an employee referred to herein as "Alice") attempts to engage in activities, such as web surfing, communications from and to the client pass through policy enforcement appliance 102. As one example, suppose Alice has launched a web browser application on client 104 and would like to visit an arbitrary web page. Appliance 102 is configured to evaluate the URL of the site Alice would like to visit and determine whether access should be permitted (and/or what constraints should be applied to that access, as applicable).

Suppose Alice would like to visit URL 402—the front page of an online news service—and enters that URL into her browser. In some embodiments, the URL is evaluated by appliance 102 as follows. In the first stage of the evaluation, the data plane consults low latency cache 306 for the presence of URL 402. URL 402 can be transformed as applicable (e.g., an MD5 hash of URL 402 is computed, and/or normalization of URL 402 is performed, such as by shortening the URL string by removing the right-most portion of the path). For the remainder of the discussion of this example, no distinction will be made between URL 402 and the MD5 (or other transformation) of the URL, to aid in clarity. It is to be assumed that if, for example, database 312 stores MD5 hashes, the queries performed against it (and any other components of appliance 102, such as one or more bloom filters) will be performed using MD5 (or other applicable) transformations of URLs, as needed.

If URL 402 is present in low latency cache 306, the associated category that is also stored in cache 306 is used to enforce any applicable policies 318. Assuming URL 402 is not present in the cache, however, (or, in embodiments where low latency cache 306 is not used by appliance 102) the next stage of evaluation is for the data plane to send a request to the management plane for classification of the URL. In some embodiments, the request is sent directly by the data plane to the management plane. In other embodiments, additional processing is performed. For example, as shown in FIG. 3, two bloom filters (342 and 344) are present in data plane 304. Using techniques described in more detail below, sets of multiple bloom filters (e.g., 342 and 344) can be used to efficiently reduce the number of potentially duplicate requests for information (e.g., deduplicating requests for classification of the same URL from the data plane to the management plane).

In various embodiments, when the management plane receives a request for classification of a URL (such as URL 402), the management plane queries database 312 for information about the URL. If the URL is present in database 312, the corresponding category (e.g., "NEWS") is returned and ultimately provided to data plane 304 (and included in cache 306 if applicable). Assuming database 312 contains no information pertinent to URL 402, the next stage of evaluation is for the management plane to send a request to a remote URL classification service (e.g., reachable via one or more networks 110). As with data plane 304, as shown in FIG. 3, a set of two bloom filters (346 and 348) is present in management plane 302. And, as with bloom filters 342 and 344, using techniques described in more detail below, bloom filters 346 and 348 can be used to efficiently reduce the number of potentially duplicate requests made for information (e.g., from the management plane to the URL classification service).

In some embodiments, URL classification service 316 is made available by the provider of the contents of database 312, and contains URL information that supplements the information included in database 312 (e.g., by including many millions of additional URLs and corresponding categories). URL service 316 can also be under the control of the owner of appliance 102 or any other appropriate party. In various embodiments, URL classification service 316 is configured to add any URLs that it receives that are unknown to it to an evaluation queue. URL classification service 316 can then crawl/evaluate the URLs in the evaluation queue and build its URL classification repository. As shown in FIG. 3, URL classification service 316 also makes use of a set of bloom filters (350, 352, and 354). As with the other bloom filters, bloom filters 350-354 can be used to efficiently handle requests for information, as will be described in more detail below.

Probabilistic Duplicate Detection

A bloom filter is a data structure that can be used to test whether a string (e.g., a URL) is a member of a set of n elements (also referred to as keys). When a bloom filter is queried for a given string, a REJECT response indicates with 100% confidence that the string is not present in the set. An ACCEPT response indicates that the string is present in the set, subject to a given false positive rate (e.g., there is a 90% chance that an element is present in a set when an ACCEPT is received in response to a query where the bloom filter has a 10% false positive rate).

Figure 4:
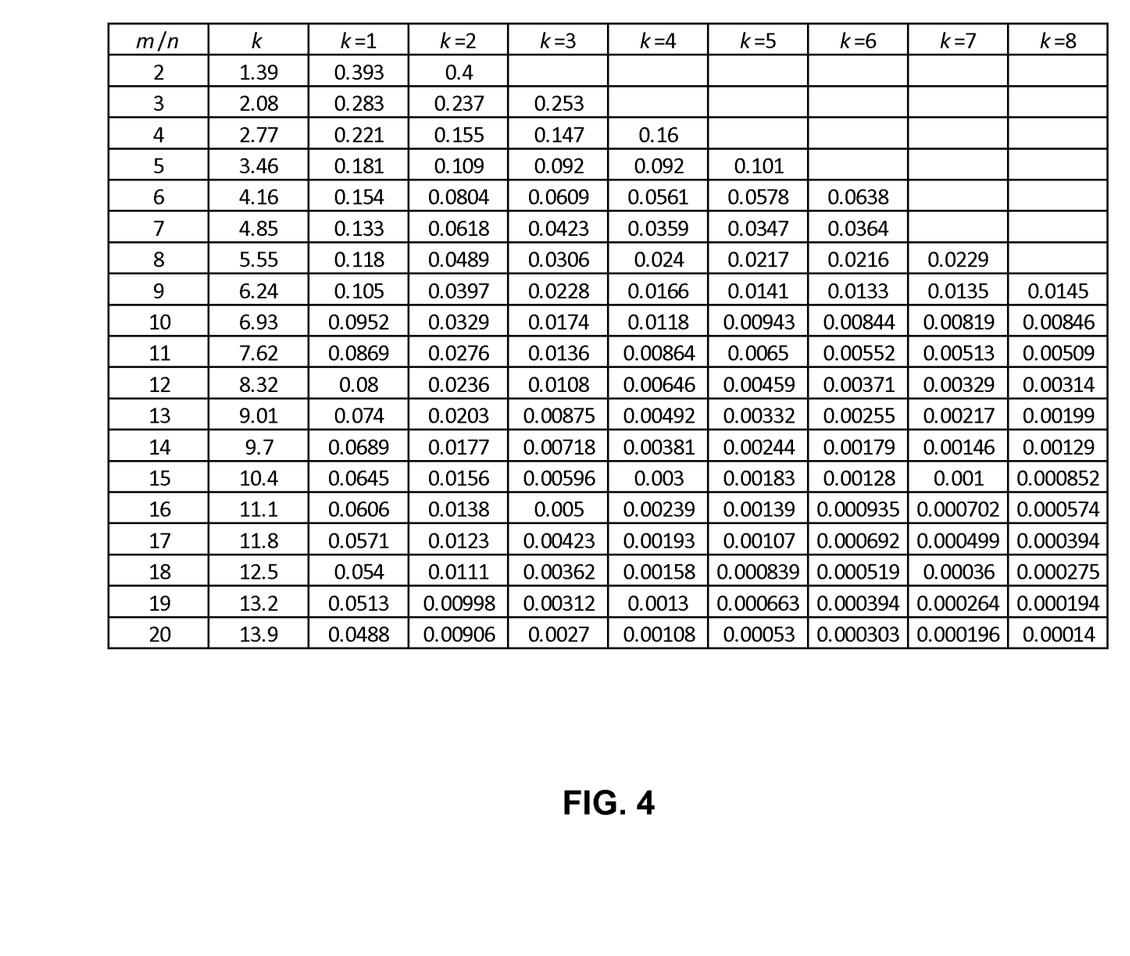
FIG. 4 illustrates a table of example false positive rates.

An empty bloom filter (e.g., at initialization) is a vector v of m bits, with each bit initially set to zero. When constructing a bloom filter, a set of k independent hash functions ($h_1$, $h_2$, $h_3$, . . . , $h_k$) is selected, with each hash function having a range of 1, . . . , m. A tradeoff exists between the size of m and the probability of a false positive. A table of example false positive rates using various selections of m, k, and the number of elements n inserted into the filter is shown in FIG. 4. In some embodiments, the probability of a false positive is determined using:

$$(\tfrac{1}{2})^k = (0.6185)^{m/n}.$$

Returning to the discussion of FIG. 3, as mentioned above, URL 402 can be directly provided by data plane 304 to management plane 302 for classification. Data plane 304 can also be configured to submit unclassified URLs (such as URL 402) as queries against a bloom filter (e.g., bloom filter 342) first (prior to submission to management plane 302). If a REJECT response is received from bloom filter 342, this is an indication (with 100% confidence) that URL 402 is not present in bloom filter 342. In response to receiving the REJECT response, data plane 304 can insert URL 402 into bloom filter 342 and also submit URL 402 to management plane 302 for evaluation. When a subsequent request is received by data plane 304 for URL 402 (assuming it has not yet been classified), an ACCEPT response to a query for the URL will be received from bloom filter 342. This response indicates that URL 402 is present in the bloom filter (and was previously submitted to management plane 302), subject to a given false positive rate. Potential duplicate requests made by data plane 304 of management plane 302 can be reduced by having data plane 304 not submit a given URL when an ACCEPT response is received from bloom filter 342.

One aspect of a bloom filter is that the likelihood of receiving false positives in response to queries increases with insertions. For example, as insertions continue to be performed on filter 342 (e.g., as new, unclassified URLs need resolving), eventually bloom filter 342 will become sufficiently full of elements that the false positive rate will exceed an amount acceptable for efficient deduplication. As bloom filter 342 continues to fill, eventually all queries will result in ACCEPT responses (as most/all bits are ultimately set to 1). As will be described in more detail below, an approach to mitigate this outcome is to use sets of two or more bloom filters for deduplication.

Figure 5:
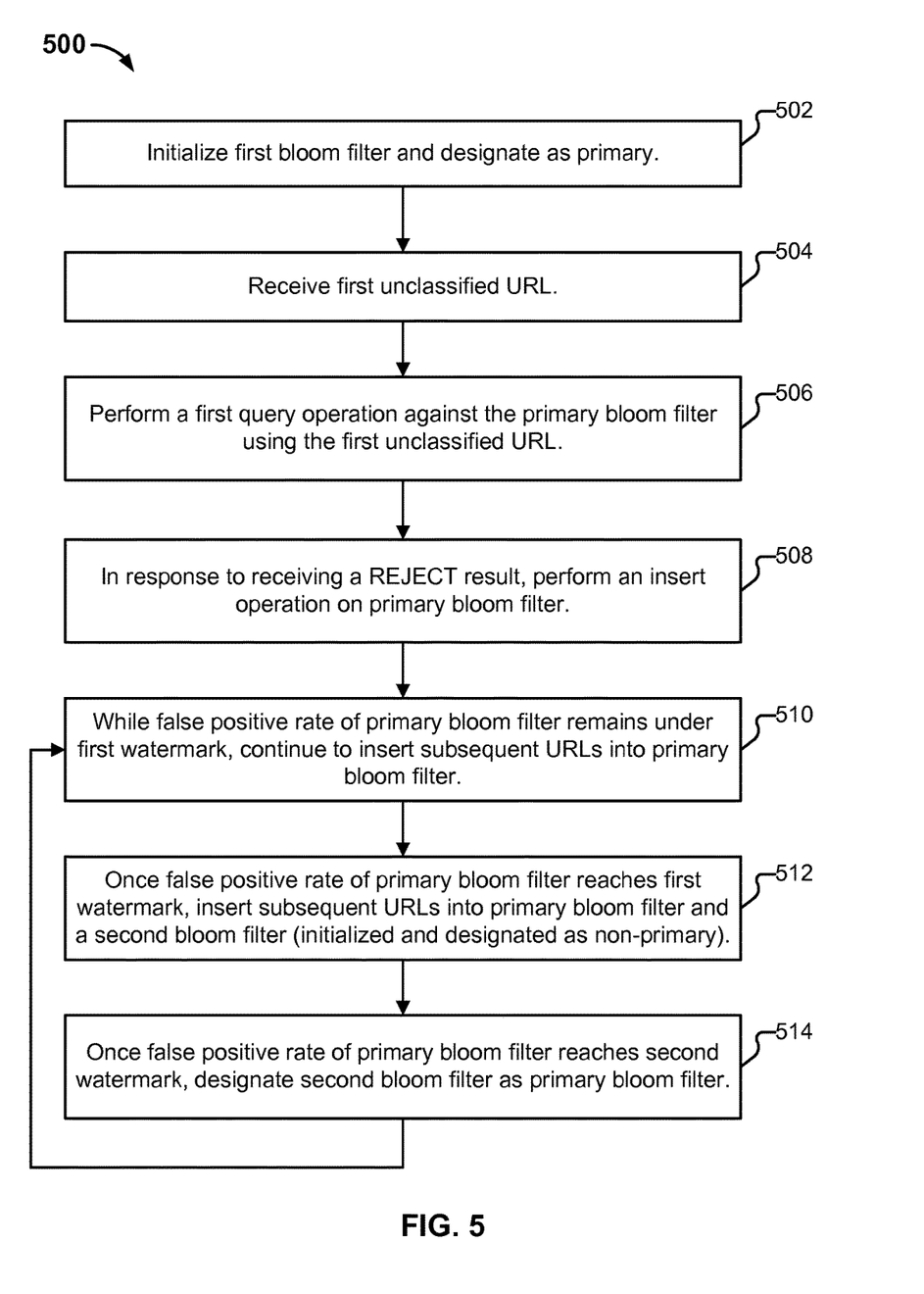
FIG. 5 illustrates a process for using a set of multiple bloom filters to perform probabilistic deduplication.

FIG. 5 illustrates a process for using a set of multiple bloom filters to perform probabilistic deduplication. Embodiments of process 500 can be performed by a variety of components depicted in FIG. 3, as well as by other entities, as applicable. For example, process 500 can be performed by data plane 304 (using bloom filters 342 and 344) in conjunction with sending messages to management plane 302. Process 500 can also be performed by management plane 302 (using bloom filters 346 and 348) in conjunction with sending messages to URL classification service 316. And, process 500 can also be performed by URL classification service 316 (using bloom filters 350-354) in conjunction with receiving messages from multiple appliances 102, 362, and 364. As yet another example, embodiments of process 500 can be performed with respect to other types of strings (instead of URLs). For example, suppose every file upload and download that is performed by clients inside network 108 is logged by appliance 102, along with the corresponding source and destination IP addresses and ports, and a hash of the file. Appliance 102 can be configured to deduplicate the logged information using the techniques described herein, prior to transmitting the log information (e.g., to a third party security service—whether offered by service 136 or another service).

As explained above, the desired false positive rate of a bloom filter is configurable, as are other aspects, such as which/how many hash functions are to be used. In some embodiments, at least some aspects of the bloom filter set (e.g., false positive rate, number of bloom filters in the set, and/or size of bloom filter) are configurable by an administrator of appliance 102 (e.g., via an interface provided by management plane 302). In other embodiments, the aspects are determined (e.g., at a factory) by the manufacturer/provider of appliance 102. One example bloom filter configuration for data plane 304 is to use three hash functions ($h_1$, $h_2$, $h_3$), a total array size of one million, and two total bloom filters. Additional parameters (described in more detail below) include a low watermark (e.g., set to 10%) and a high watermark (e.g., set to 20%). An example bloom filter configuration for management plane 302 is to use five hash functions ($h_1$, $h_2$, $h_3$, $h_4$, $h_5$), a total array size of ten million, two total bloom filters, a low watermark of 5%, and a high watermark of 10%. Finally, in various embodiments, the URL classification service commands significantly more computing resources than appliance 102 (e.g., being deployed using a scalable, elastic infrastructure comprising multiple servers, solid state drives, and/or other applicable high-performance hardware). Accordingly, an example bloom filter configuration for the URL classification service could use significantly more resources (e.g., using seven hash functions; a total array size of 100 billion, three (or more) bloom filters, watermarks at 2%, 4%, and 6%, etc.).

In the following discussion, suppose process 500 is performed by data plane 304. Process 500 begins at 502 when a first bloom filter is initialized and designated as the primary bloom filter. As one example, at 502, bloom filter 342 is instantiated, with all one million bits in its array initially set to zero. The first bloom filter can be automatically initialized when appliance 102 is started (e.g., powered on), can be initialized whenever appropriate commands are received (e.g., from an administrator requesting an initialization), and can also reoccur (e.g., a re-initialization can occur) multiple times in conjunction with process 500, as described in more detail below. In various embodiments, a second bloom filter is also initialized at 502 (i.e., both bloom filter 342 and 344 are initialized at 502). The initialization of the second bloom filter (344) can also be performed at a later time (i.e., after bloom filter 342 is initialized, but before/in conjunction with a first insertion being made to bloom filter 344).

At 504, an unclassified URL is received. As one example, an unclassified URL is received in response to client 104 requesting URL 402, as described above. At 506, a query is performed against the primary bloom filter (e.g., bloom filter 342) using the received unclassified URL (or a transformation/portion of that URL, as described above and as applicable in various embodiments). In response to receiving a REJECT (also referred to as a "no match") response to the query, the URL is inserted into the primary bloom filter (but not the second bloom filter) at 508.

Additional queries will continue to be performed against the primary bloom filter (342 in this example) as unclassified URLs are received by data plane 304, and additional insertions will be made in response to REJECTions, so long as the false positive rate of the primary bloom filter remains under a given threshold (510). As explained above, and as further illustrated in FIG. 4, as the number of elements n inserted in to a bloom filter increases, so too does the false positive rate. Suppose a false positive rate of 20% (0.2) is the configured maximum for use by data plane 304. If data plane 304 is using k=3 hash functions, its primary bloom filter (i.e., the one against which queries are made) can have a ratio for m/n of up to approximately 3.5. The false positive rate of 20% (or, in other embodiments, similar values, such as the corresponding ratio for m/n or approximation thereof) can be used as a high watermark value. In some embodiments, the low watermark is set as half of the high watermark value. In this example (and referring to the chart depicted in FIG. 4), the low watermark is 10% and the primary bloom filter can have an approximate ratio for m/n of 5. As another example of high and low watermarks, suppose process 500 is performed by management plane 302 (using k=5). If the false positive rate of 10% (0.1) is the configured maximum for use by management plane 302, its respective primary bloom filter can have an approximate ratio for m/n of 5, which can be used as the high watermark. If the low watermark is set at 5% (half of 10%), then the primary bloom filter can have an approximate ratio for m/n of 6.5.

Returning to process 500 (as performed by data plane 304), as explained above, insertions of unclassified URLs REJECTed by bloom filter 342 will continue until a given threshold is reached for the bloom filter's false positive rate (510). One example of such a threshold used in various embodiments is a low watermark (e.g., a 10% rate for bloom filter 342). Once the low watermark is reached, queries for URLs will continue to be made against the primary bloom filter, however insertions (for REJECTed URLs) will be made in both the primary bloom filter (342) and also a second bloom filter (512). The second bloom filter, when initialized (whether at 502 or at a later time, such as just prior to portion 512 of the process) is designated as non-primary (also referred to herein as "secondary").

Queries for URLs will continue to be made against the primary bloom filter, and insertions made to both the primary and secondary bloom filters (512), until a second false positive threshold (e.g., the high watermark) is reached. At that time (514), the secondary bloom filter (344 in this example) is designated as the primary bloom filter. The originally designated primary bloom filter (342), no longer used for queries or insertions, is deleted, re-initialized, etc., so that the resources it previously consumed can be recovered.

In some embodiments, such as the embodiment of process 500 shown in FIG. 5, the processing flow moves from portion 514 of the process, to portion 510, meaning that insertions will be made using only the primary bloom filter until a first threshold is reached (510), and, once the first threshold is reached, insertions will be made against both the primary bloom filter and a new secondary bloom filter until a second threshold is reached (512), etc. In other embodiments, the processing flow moves from portion 514 of the process, to portion 512, meaning that the first threshold is only used once in process 500 (at the initiation of the process), with two bloom filters always being inserted into, but only one (that is designated as primary) used for queries at a given time. In various embodiments, instead of using threshold accuracy values (e.g., 5% and 10%), threshold times are used (e.g., with the first threshold being the elapsing of one hour, and the second threshold being the elapsing of a second hour). In this scenario, the times (e.g., one hour and two hours) can be selected to approximate the amount of time a given appliance will typically take to achieve respective accuracy thresholds. Process 500 continues until terminated (e.g., due to appliance 102 shutting down).

Figure 6:
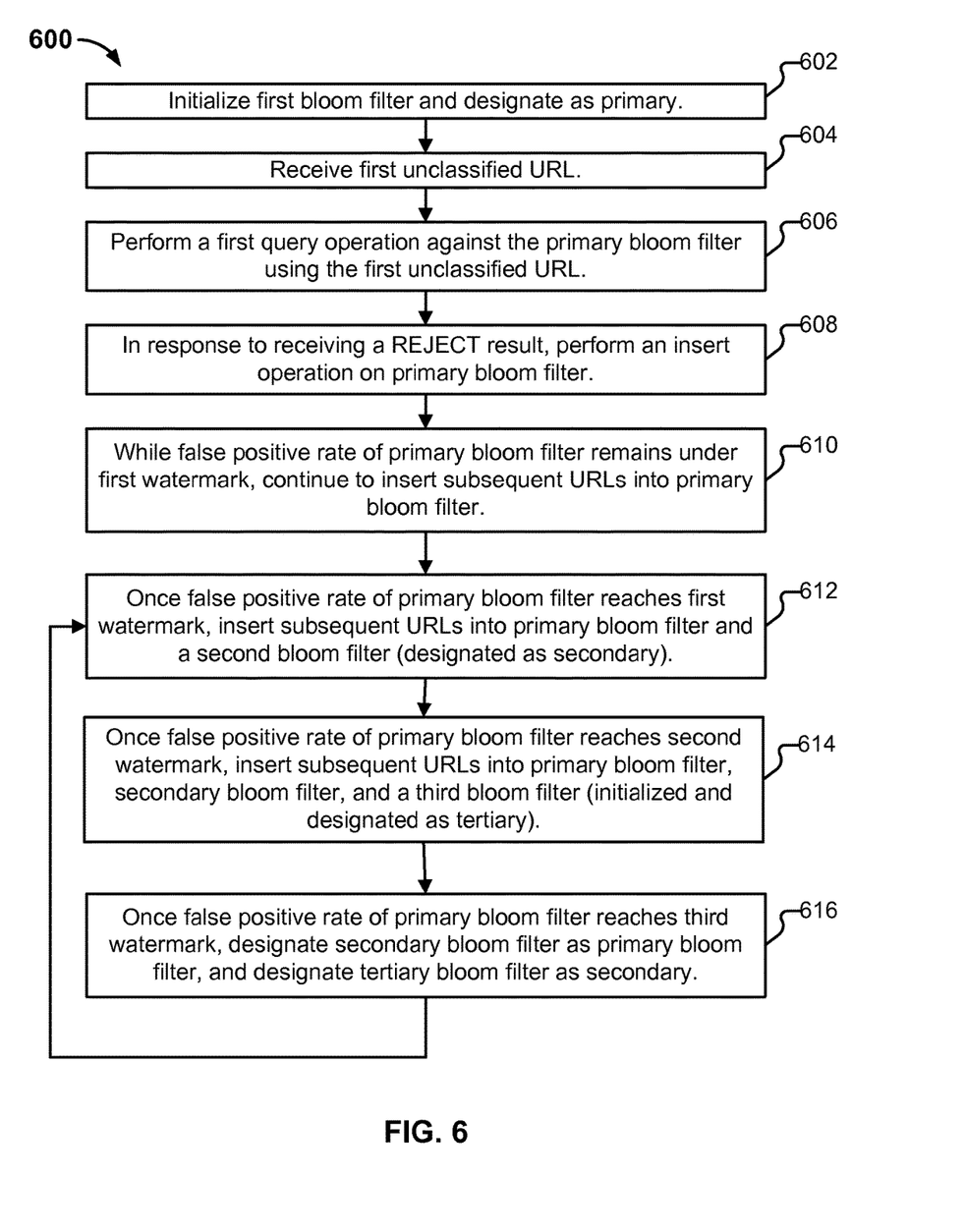
FIG. 6 illustrates a process for using a set of multiple bloom filters to perform probabilistic deduplication.

As explained above, process 500 (or embodiments thereof) can be used by other components/entities, instead of/in addition to data plane 304, and process 500 adapted as applicable. For example, management plane 302 can use process 500 with respect to bloom filters 346 (designated as primary) and 348 (initially designated secondary), using the low/high watermarks of 5% and 10% with respect to the URL requests it transmits to URL classification service 316. As another example, URL classification service 316 can use a modified version of process 500 which incorporates a third bloom filter and a third watermark. In this embodiment of process 500 (shown in FIG. 6 as process 600), portions 602-612 of the process proceed as with portions 502-512 of process 500. However, at 614, once the second threshold is reached (e.g., 4% false positive rate for queries), subsequently received URLs will be inserted into three bloom filters (350-354), with queries being performed against the primary bloom filter. And, at 616, once a third threshold is reached (e.g., 6% false positive rate for queries), the secondary bloom filter is designated primary, the tertiary bloom filter is designated as secondary, and the originally designated primary bloom filter is re-initialized/deleted as applicable, with processing flowing back to portion 612 of the process.

Figure 7:
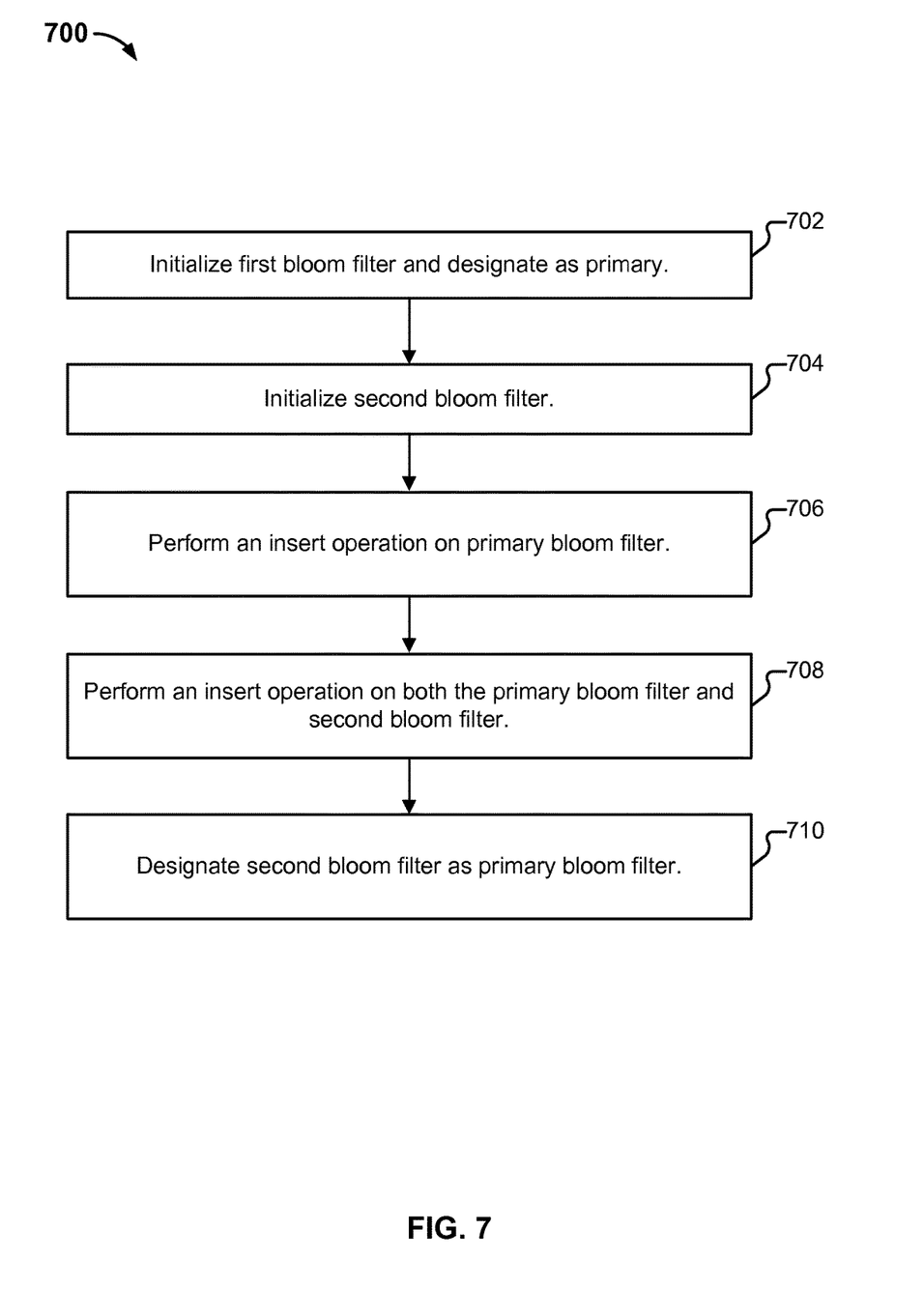
FIG. 7 illustrates a process for using a set of multiple bloom filters to perform probabilistic deduplication.

FIG. 7 illustrates a process for using a set of multiple bloom filters to perform probabilistic deduplication. As with process 500, embodiments of process 700 can be performed by a variety of components depicted in FIG. 3, as well as by other entities, as applicable.

The process begins at 702 when a first bloom filter for tracking probabilistic receipt of data strings is initialized and initially designated as authoritative. As mentioned above, the techniques described herein can be used with a variety of types of strings, and need not be limited to URLs. For example, log data (e.g., including IP addresses, ports, and file identifiers/hashes, or transformations/normalizations thereof) can be deduplicated using techniques described herein. At 704, a second bloom filter is initialized and is not initially designated as authoritative.

At 706, a first data string is received, and an insertion operation is performed on the first bloom filter, using at least a portion of the first data string. As explained above, a URL is one example of such a data string. A log data line (or other excerpt of log data) is another example of such a data string.

At 708, at a time subsequent to receiving the first data string, a second data string is received. An insertion operation is performed on both the first bloom filter and the second bloom filter, using at least a portion of the second data string. Finally, at 710, in response to a triggering event occurring, the second bloom filter is designated as authoritative.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system, comprising:
an interface configured to receive a first unclassified uniform resource locator (URL);
a processor configured to:
initialize an originally primary bloom filter;

initialize a secondary bloom filter;
in response to receiving a "no match" result from querying the primary bloom filter for the received first unclassified URL, perform insert operations on both the originally primary bloom filter and the secondary bloom filter; and
at a time subsequent to inserting the first unclassified URL into both the originally primary and secondary bloom filters, designate the secondary bloom filter as a replacement primary, wherein the designation is made in response to a determination that a current false positive false positive rate associated with the originally primary bloom filter exceeds a threshold and wherein the current false positive rate associated with the originally primary bloom filter is larger than an original false positive rate associated with the originally primary bloom filter; and
a memory coupled to the processor and configured to provide the processor with instructions.

2. The system of claim 1 wherein the processor is further configured to erase the originally primary bloom filter in conjunction with designating the secondary bloom filter as replacement primary.

3. The system of claim 1 wherein the processor is further configured to reinitialize the originally primary bloom filter in conjunction with designating the secondary bloom filter as replacement primary.

4. The system of claim 1 wherein, in conjunction with performing the insert operations on both the originally primary bloom filter and secondary bloom filter, the processor is further configured to transmit the first unclassified URL for additional processing.

5. The system of claim 1 wherein prior to receiving the first unclassified URL, the processor is configured to perform insert operations on only the originally primary bloom filter, and in response to a first triggering event, is configured to perform insert operations on both the originally primary bloom filter and the secondary bloom filter.

6. The system of claim 5 wherein the first triggering event comprises an elapsing of an amount of time.

7. The system of claim 5 wherein the first triggering event comprises reaching an accuracy threshold in the originally primary bloom filter.

8. A method, comprising:
receiving a first unclassified uniform resource locator (URL);
initializing an originally primary bloom filter;
initializing a secondary bloom filter;
in response to receiving a "no match" result from querying the primary bloom filter for the received first unclassified URL, performing insert operations on both the originally primary bloom filter and the secondary bloom filter; and
at a time subsequent to inserting the first unclassified URL into both the originally primary and secondary bloom filters, designating the secondary bloom filter as a replacement primary wherein the designation is made in response to a determination that a current false positive false positive rate associated with the originally primary bloom filter exceeds a threshold and wherein the current false positive rate associated with the originally primary bloom filter is larger than an original false positive rate associated with the originally primary bloom filter.

9. The method of claim 8 further comprising erasing the originally primary bloom filter in conjunction with designating the secondary bloom filter as replacement primary.

10. The method of claim 8 further comprising reinitializing the originally primary bloom filter in conjunction with designating the secondary bloom filter as replacement primary.

11. The method of claim 8 wherein, in conjunction with performing the insert operations on both the originally primary bloom filter and secondary bloom filter, the first unclassified URL is transmitted for additional processing.

12. The method of claim 8 wherein prior to receiving the first unclassified URL, insert operations are performed only on the originally primary bloom filter, and in response to a first triggering event, insert operations are performed on both the originally primary bloom filter and the secondary bloom filter.

13. The method of claim 12 wherein the first triggering event comprises an elapsing of an amount of time.

14. The method of claim 12 wherein the first triggering event comprises reaching an accuracy threshold in the originally primary bloom filter.

15. A computer program product embodied in a non-transitory computer readable storage medium and comprising computer instructions for:
receiving a first unclassified uniform resource locator (URL);
initializing an originally primary bloom filter;
initializing a secondary bloom filter;
in response to receiving a "no match" result from querying the primary bloom filter for the received first unclassified URL, performing insert operations on both the originally primary bloom filter and the secondary bloom filter; and
at a time subsequent to inserting the first unclassified URL into both the originally primary and secondary bloom filters, designating the secondary bloom filter as a replacement primary, wherein the designation is made in response to a determination that a current false positive false positive rate associated with the originally primary bloom filter exceeds a threshold and wherein the current false positive rate associated with the originally primary bloom filter is larger than an original false positive rate associated with the originally primary bloom filter.

16. The computer program product recited in claim 15, further comprising computer instructions for erasing the originally primary bloom filter in conjunction with designating the secondary bloom filter as replacement primary.

17. The computer program product recited in claim 15 further comprising computer instructions for reinitializing the originally primary bloom filter in conjunction with designating the secondary bloom filter as replacement primary.

18. The computer program product recited in claim 15 wherein, in conjunction with performing the insert operations on both the originally primary bloom filter and secondary bloom filter, the first unclassified URL is transmitted for additional processing.

19. The computer program product recited in claim 15 wherein, prior to receiving the first unclassified URL, insert operations are performed only on the originally primary bloom filter, and in response to a first triggering event, insert operations are performed on both the originally primary bloom filter and the secondary bloom filter.

20. The computer program product recited in claim 19 wherein the first triggering event comprises an elapsing of an amount of time.

21. The computer program product recited in claim 19 wherein the first triggering event comprises reaching an accuracy threshold in the originally primary bloom filter.

\* \* \* \* \*